United States Patent Office 2,797,300
Patented June 25, 1957

1

2,797,300
WELDING

Lowell H. Hawthorne, Verona, N. Y., assignor to Revere Copper and Brass Incorporated, Rome, N. Y., a corporation of Maryland No Drawing. Application March 3, 1955,
Serial No. 492,033

5 Claims. (Cl. 219—74)

My invention relates to welding, and particularly to welding copper by use of so-called "copper" welding rod or wire.

Heretofore it has been attempted to weld copper with copper weld metal by use of welding rods or wires consisting of copper containing small amounts of various other elements for improving the welding operation and the weld, the end fractions of the rod or wire being progressively melted by use of the acetylene torch or carbon arc for forming the weld metal and applying it in molten condition to the joint to be welded thereby. These attempts have not given entirely satisfactory results because the welding operation could be performed only slowly with consequent high labor costs, and because the resulting weld metal was so porous that the welded joint was markedly weak. In these respects the results secured were not at all comparable to those secured when welding other metals by use of non-cuprous welding rod or wire.

It also has been attempted to weld copper with copper weld metal by practice of more recently developed methods according to which a metallic arc is struck against the work from the end of the welding rod or wire to form and apply the weld metal, the arc and molten weld metal being shielded from the surrounding air by an inert atmosphere such as argon or helium. This attempt has been found to give unsatisfactory results in an overall sense when employing copper welding rod or wire of heretofore known compositions. Although by welding by this method the weld can be effected more rapidly, the weld metal when such rod or wire is employed is in many cases even more porous and the weld weaker than those secured by use of the above described older methods.

Applicant however has discovered that copper may be satisfactorily welded by use of copper weld metal, by practice of the above mentioned more recently developed method, by incorporating into the copper of the welding rod or wire a small amount of substance or substances effective to prevent formation of copper oxides in the weld metal and at the same time make the molten weld metal of sufficiently high fluidity and sufficiently low surface tension to permit the discharge from the molten metal of any oxides, non-metallics, and other undesirable inclusions so that the same will collect as a non-adhering scum or the like on the surface of the molten weld metal and may be readily removed from the weld when the weld metal solidifies.

Applicant has discovered that the above desirable results may be secured by alloying, with the copper of the welding rod or wire, a small amount of tin within the range of approximately 0.1 to 1.5% for giving the molten weld metal the above mentioned high fluidity, and a small amount of titanium within the range of approximately 0.05 to 0.35% for preventing formation of copper oxides

2 in the weld metal and at the same time reducing the surface tension of such molten metal to such extent as will permit any oxides, non-metallics, and other undesirable inclusions that may be contained therein to break through the surface thereof and collect on such surface as the above mentioned scum or the like, these oxides and other inclusions readily rising to the surface of the molten weld metal because of its high fluidity imparted by the tin. Although the tin acts to some extent to impart strength to the weld metal and weld, applicant has further found that such strength may be markedly augmented and be regulated by also incorporating, into the copper of the welding rod or wire, a small amount of silicon within the approximate range of 0.05 to 1%, and without deleteriously affecting the fluidity imparted by the tin or the reduction in surface tension imparted by the titanium. Silicon itself is a deoxidizer, and thus in no way acts to decrease the efficacy of the more powerful deoxidizer titanium in respect to the titanium acting to prevent formation of copper oxides in the weld metal.

It has been found that under most conditions optimum results will be secured when the welding rod or wire according to the present invention is composed of approximately 0.75% tin, 0.15% titanium, and 0.25% silicon, with the balance essentially all copper.

It will be understood that in the appended claims the term "welding wire" includes "welding rod," these terms being employed in the art rather loosely and more or less as synonyms. It will also be understood that within the scope of the appended claims other elements may be added to the copper welding wire as modifiers so long as they do not substantially affect the above described functions of the tin, titanium and silicon. Among such modifiers is silver, which may be employed in appreciable amounts up to about 3% for increasing the electrical conductivity of the weld when such increase is desired, the balance of the welding wire in respect to the tin, titanium and silicon and their functions and effects still being essentially all copper when silver is employed in such amounts. In general far superior results will be secured if the welding wire is substantially free from elements which tend to soften the weld metal, for example, elements such as lead, selenium, tellurium and sulphur; elements which tend to volatilize at the temperatures of the arc and molten weld metal, for example, elements such as zinc and cadmium; and elements which tend to diminish the weldability of the weld metal in respect to its securing a satisfactory bond, for example, elements such as aluminum, antimony and bismuth.

I claim:

1. The method of welding copper and copper base alloys which comprises arc melting a copper welding wire and applying the metal as so melted to the joint to be welded, all in a shielding atmosphere of inert gas such as argon or helium, and causing the molten weld metal to have such high fluidity and such low surface tension as will permit oxides and other foreign inclusions to rise to and break through the surface of such molten weld metal by utilizing for the copper welding wire one containing tin within the range of approximately 0.1 to 1.5% for securing such fluidity, and containing titanium within the range of approximately 0.05 to 0.3% for securing such surface tension, with the balance of the wire essentially all copper.

2. The method according to claim 1 in which the strength of the weld is regulated by utilizing for the copper welding wire one which in addition to the tin and titanium contains silicon within the range of approximately 0.05 to 1%, the balance of the wire in respect to such elements being essentially all copper.

3. Welding wire consisting of, approximately, 0.1 to 1.5% tin, 0.5 to 0.3% titanium, 0.05 to 1% silicon, with the balance essentially all copper.

4. Welding wire consisting of, approximately, 0.1 to 1.5% tin, 0.05 to 0.3% titanium, 0.05 to 1% silicon, with the balance essentially all copper, and substantially free from lead, tellurium, selenium, sulphur, zinc, cadmium, aluminum, antimony and bismuth.

5. Welding wire according to claim 3 consisting of, approximately, 0.75% tin, 0.15% titanium, 0.25% silicon, with the balance essentially all copper.

References Cited in the file of this patent

UNITED STATES PATENTS

| | | |
|---|---|---|
| 1,151,744 | Vickers | Aug. 31, 1915 |
| 2,166,794 | Brophy | July 18, 1939 |
| 2,220,464 | Smith | Nov. 5, 1940 |
| 2,307,512 | Kelly | Jan. 5, 1943 |

UNITED STATES PATENT OFFICE

CERTIFICATE OF CORRECTION

Patent No. 2,797,300 June 25, 1957

Lowell H. Hawthorne

It is hereby certified that error appears in the printed specification of the above numbered patent requiring correction and that the said Letters Patent should read as corrected below.

Column 3, line 5, for "0.5 to 0.3%" read --0.05 to 0.3%--.

Signed and sealed this 20th day of August 1957.

(SEAL)
Attest:
KARL H. AXLINE
Attesting Officer

ROBERT C. WATSON
Commissioner of Patents